(12) United States Patent
Moosavi et al.

(10) Patent No.: US 10,694,543 B2
(45) Date of Patent: Jun. 23, 2020

(54) NETWORK NODES, AND METHODS THEREIN FOR ESTABLISHMENT OF A NEIGHBOUR NODE RELATION

(71) Applicant: Telefonaktiebolaget LM Ericsson (publ), Stockholm (SE)

(72) Inventors: Reza Moosavi, Linköping (SE); Fredrik Gunnarsson, Linköping (SE); Pradeepa Ramachandra, Linköping (SE); Kristina Zetterberg, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 93 days.

(21) Appl. No.: 15/558,626

(22) PCT Filed: Oct. 28, 2016

(86) PCT No.: PCT/SE2016/051059
§ 371 (c)(1),
(2) Date: Sep. 15, 2017

(87) PCT Pub. No.: WO2018/080362
PCT Pub. Date: May 3, 2018

(65) Prior Publication Data
US 2018/0249498 A1    Aug. 30, 2018

(51) Int. Cl.
*H04W 74/08* (2009.01)
*H04W 76/10* (2018.01)
(Continued)

(52) U.S. Cl.
CPC ..... *H04W 74/08* (2013.01); *H04W 36/00835* (2018.08); *H04W 76/10* (2018.02); *H04W 92/16* (2013.01); *H04B 17/318* (2015.01)

(58) Field of Classification Search
CPC .............................. H04W 76/08; H04W 76/10
(Continued)

(56) References Cited

U.S. PATENT DOCUMENTS

| 8,989,153 B2 | 3/2015 | Uemura et al. |
| 2009/0264118 A1 | 10/2009 | Robson |

(Continued)

FOREIGN PATENT DOCUMENTS

| WO | WO-2009084838 A1 * | 7/2009 | ......... H04L 27/2601 |
| WO | 2011031194 A1 | 3/2011 | |

(Continued)

OTHER PUBLICATIONS

Dahlen, Anders et al., "Evaluations of LTE Automatic Neighbor Relations", IEEE 73rd Vehicular Technology Conference (VTC Spring), May 15-18, 2011, 1-5.
(Continued)

*Primary Examiner* — Angel T Brockman
(74) *Attorney, Agent, or Firm* — Sage Patent Group

(57) ABSTRACT

A first network node 204 and method therein for establishing a neighbour relation with a second network node 206 is disclosed. The first and second network nodes are operating in a wireless communications network 200. The first network node receives a random access request from a communications device 210 operating in the wireless communications network. For neighbour node determination, the first network node transmits, to a third network node 208, a first information relating to an identity of a preamble comprised in the received random access request and to a first reception time of the random access request. The first network node establishes a neighbour relation with the second network node based on a neighbour node determination performed based on the first information by the third network node.

24 Claims, 9 Drawing Sheets

Method performed by first network node 204

(51) Int. Cl.
*H04W 92/16* (2009.01)
*H04W 36/00* (2009.01)
*H04B 17/318* (2015.01)

(58) Field of Classification Search
USPC .......................................................... 370/329
See application file for complete search history.

(56) References Cited

U.S. PATENT DOCUMENTS

| | | | |
|---|---|---|---|
| 2012/0113938 A1* | 5/2012 | Larsson | H04W 74/008 370/329 |
| 2013/0244718 A1 | 9/2013 | Lee et al. | |
| 2013/0322289 A1 | 12/2013 | Zhu et al. | |
| 2014/0162646 A1 | 6/2014 | Lee et al. | |
| 2015/0223229 A1* | 8/2015 | Bentland | H04B 7/024 370/329 |
| 2018/0249498 A1 | 8/2018 | Moosavi et al. | |

FOREIGN PATENT DOCUMENTS

| | | |
|---|---|---|
| WO | 2012107175 A2 | 8/2012 |
| WO | 2015066861 A1 | 5/2015 |
| WO | 2018052343 A1 | 3/2018 |

OTHER PUBLICATIONS

Unknown, Author, "Automatic Base Station Relations in NR", 3GPP TSG-RAN WG3 #93, R3-161902, Ericsson, Gothenburg, Sweden, Aug. 22-26, 2016, 3 pages.

Unknown, Author, "Small Cell Discovery in HetNet Based on Existed Uplink Signal", 3GPP TSG-RAN WG2 #83, R2-132295, FiberHome Technologies Group, Barcelona, Spain, Aug. 19-23, 2013, 5 pages.

* cited by examiner

Figure 4 Method performed by first network node 204

Figure 6 Method performed by second network node 208

NETWORK NODES, AND METHODS THEREIN FOR ESTABLISHMENT OF A NEIGHBOUR NODE RELATION

Embodiments herein relate generally to a first network node, a second network node, a third network node and to methods therein. In particular, embodiments herein relate to the establishment of a neighbour node relation.

BACKGROUND

Communications devices such as terminals are also known as e.g. User Equipments (UEs), mobile terminals, stations (STAs), wireless devices, wireless terminals and/or mobile stations. Terminals are enabled to communicate wirelessly in a wireless communications network, such as a Wireless Local Area Network (WLAN) or a cellular communications network sometimes also referred to as a cellular radio system or cellular networks. The communication may be performed e.g. between two terminals, between a terminal and a regular telephone and/or between a terminal and a server via an access network and possibly one or more core networks, comprised within the wireless communications network.

The above communications devices may further be referred to as mobile telephones, cellular telephones, laptops, tablets or sensors with wireless capability, just to mention some further examples. The communications devices in the present context may be, for example, portable, pocket-storable, hand-held, wall-mounted, computer-comprised, or vehicle-mounted mobile devices. The communications devices are enabled to communicate voice and/or data, via an access network, such as a Radio Access Network (RAN), with another entity, such as e.g. an Access Point (AP), another communications device or a server.

The communications network covers an area, e.g. a geographical area, which is divided into subareas, such as coverage areas, cells or clusters. In a cellular communications network each cell area is served by an access node such as a base station, e.g. a Radio Base Station (RBS), which sometimes may be referred to as e.g. eNodeB (eNB), NodeB, B node, or Base Transceiver Station (BTS), depending on the technology and terminology used. The base stations may be of different classes such as e.g. macro eNodeB, home eNodeB, micro eNode B or pico base station, based on transmission power, functional capabilities and thereby also cell size. A traditional cell is the area where radio coverage is provided by the base station at a base station site. One base station, situated on the base station site, may serve one or several cells. Further, each base station may support one or several communication technologies. The base stations communicate over the air interface operating on radio frequencies with the communications devices within range of the base stations. In the context of this disclosure, the expression Downlink (DL) is used for the transmission path from the base station to the communications device. The expression Uplink (UL) is used for the transmission path in the opposite direction i.e. from the communications device to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

Ultra-Lean System Design of NeXt Generation (NX)

A design principle currently under consideration for the NX generation communications networks, also known as Next Radio or New Radio (NR) in 3GPP context, is to base it on an ultra-lean design. This implies avoidance of "always on signals" from the communications network as much as possible. Some examples of benefits from such design principle is expected to be a significantly lower network energy consumption, a better scalability, a higher degree of forward compatibility during the Radio Access Technology (RAT) evolution phase, a lower interference from system overhead signals and consequently higher throughput in low load scenario, and an improved support for user centric beam-forming.

Heavy Use of (Massive) Beam-Forming

Advanced Antenna Systems (AAS) is an area where technology has advanced significantly in recent years and where a rapid technology development in the years to come is foreseen. Hence it is natural to assume that advanced antenna systems in general and massive Multiple Input Multiple Output (MIMO) transmission and reception in particular will be a cornerstone in a future NX communications network.

Mobility Reference Signals

In deployments with large antenna arrays and many possible candidate beam configurations, all beams cannot transmit signals in an always-on, static manner for the sake of mobility measurements. Instead, the connected access nodes select a relevant set of mobility beams to transmit when required. Each mobility beam carries a unique Mobility Reference Signal (MRS). The communications device, e.g. the UE, is then instructed to measure on each MRS and report information relating to the performed measurement back to the communications network, e.g. to an access node. Based on some criteria, for example a difference between MRS strength between two mobility beams, a handover can be triggered. For mobility to work efficiently, the involved Access Nodes (ANs) need to maintain beam neighbour lists, exchange beam information, and coordinate MRS usage.

Access Node, e.g. Base Station, Relations

Despite advanced radio network planning tools, it is very difficult to predict the radio propagation in detail. As a consequence, it is difficult to predict which base stations that needs to have a relation with each other and maybe also a direct connection with each other prior to the network deployment. This has been addressed in LTE, where UEs could be requested to retrieve unique information from the system information broadcast of unknown base stations and report to the serving base station. Such information was used to convey messages to the unknown base station via the core network, which maintained a lookup table from a unique identifier to an established S1 connection. One such message was used to request transport network layer address information necessary for a direct base station to base station connection for the X2 interface. In order for smooth operations of the mobility procedure in the NX generation, the NX node needs to have a concrete list of neighbouring NX nodes which can be handover candidates for the UEs.

Random Access

The random access procedure in a wireless communication network, such as LTE, is outlined in FIG. 1.

In Action 101 a communications device, e.g. a UE, transmits a random access preamble to an access node, e.g. an eNB. The random access preamble allows the eNB, to estimate the transmission timing of the UE. Uplink synchronization is necessary as the UE otherwise cannot transmit any uplink data.

In Action 102 the communications network, e.g. by means of the eNB, transmits a Random Access Response (RAR) to the UE including a timing advance command to correct the uplink timing, based on the time of arrival measurement in Action 101. In addition to establishing uplink synchronization, Action 102 also assigns, a temporary identifier to the UE, and temporary identifier of the node, to be used in Action 103 in the random access procedure.

In Action 103 the UE transmit a signal to the communications network in order to setup connection. For example, the UE may transmit an RRC Connection Request to the eNB. A primary function of this message is to uniquely identify the UE. The exact content of this signaling depends on the state of the UE, e.g., whether it was previously known to the communications network or not.

In Action 104 the communications network, e.g. the eNB, performs contention resolution in case multiple UEs tried to access the communications network on the same resource. For example, an RRC Connection Setup may be transmitted from the network, e.g. from the eNB, to the UE.

A drawback with prior art solutions, such as the LTE solution, for establishing neighbour node relations is that they are based on the transmission of always-on signals, e.g. always-on reference signals. But the always-on signaling is absent or very sparse in a NX communications network by design and therefore are not very useful when establishing neighbor relations in a NX communications network which thus requires a different approach compared to the existing LTE solutions.

SUMMARY

An object of embodiments herein is to address at least some of the above-mentioned drawbacks among others and to improve the performance in a wireless communications network.

According to one aspect of embodiments herein, the object is achieved by a method performed by a first network node for establishing a neighbour relation with a second network node. The first network node and the second network node are operating in a wireless communications network.

The first network node receives a random access request from a communications device operating in the wireless communications network.

Further, for neighbour node determination, the first network node transmits, to a third network node operating in the wireless communications network, a first information. The first information relates to an identity of a preamble comprised in the received random access request and to a first reception time of the random access request.

Furthermore, the first network node establishes a neighbour relation with the second network node based on a neighbour node determination performed based on the first information by the third network node.

According to another aspect of embodiments herein, the object is achieved by a first network node for establishing a neighbour relation with a second network node. The first network node and the second network node are configured to operate in a wireless communications network.

The first network node is configured to receive a random access request from a communications device operating in the wireless communications network.

Further, for neighbour node determination, the first network node is configured to transmit, to a third network node operating in the wireless communications network, a first information. The first information is configured to relate to an identity of a preamble comprised in the received random access request and to a first reception time of the random access request.

Furthermore, the first network node is configured to establish a neighbour relation with the second network node based on a neighbour node determination performed based on the first information by the third network node.

According to another aspect of embodiments herein, the object is achieved by a method performed by a second network node for establishing a neighbour relation with a first network node. The first network node and the second network node are operating in a wireless communications network.

The second network node receives a random access request from a communications device operating in the wireless communications network.

Further, for neighbour node determination, the second network node transmits, to a third network node operating in the wireless communications network, a second information. The second information relates to an identity of a preamble comprised in the received random access request and to a second reception time of the random access request.

Furthermore, the second network node establishes a neighbour relation with the first network node based on a neighbour node determination performed based on the second information by the third network node.

According to another aspect of embodiments herein, the object is achieved by a second network node for establishing a neighbour relation with a first network node. The first network node and the second network node are configured to operate in a wireless communications network.

The second network node is configured to receive a random access request from a communications device operating in the wireless communications network.

Further, for neighbour node determination, the second network node is configured to transmit, to a third network node operating in the wireless communications network, a second information. The second information relates to an identity of a preamble comprised in the received random access request and to a second reception time of the random access request.

Furthermore, the second network node is configured to establish a neighbour relation with the first network node based on a neighbour node determination performed based on the second information by the third network node.

According to one aspect of embodiments herein, the object is achieved by a method performed by a third network node for requesting establishment of a neighbour relation between a first network node and a second network node. The first network node and the second network node are operating in a wireless communications network.

The third network node receives, from the first network node, a first information. The first information relates to an identity of a preamble comprised in a random access request received by the first network node and to a first reception time of the received random access request.

Further, the third network node receives, from the second network node, a second information. The second information relates to the identity of the preamble comprised in a random access request a random access request received by the second network node and to a second reception time of the received random access request.

Furthermore, the third network node determines the first network node and the second network node as being neighbour nodes, and requests the first network node and the second network node to establish a neighbour relation.

According to another aspect of embodiments herein, the object is achieved by a third network node for requesting establishment of a neighbour relation between a first network node and a second network node. The first network node and the second network node are configured to operate in a wireless communications network.

The third network node is configured to receive, from the first network node, a first information. The first information relates to an identity of a preamble comprised in a random access request received by the first network node and to a first reception time of the received random access request.

Further, the third network node is configured to receive, from the second network node, a second information. The second information relates to the identity of the preamble comprised in a random access request a random access request received by the second network node and to a second reception time of the received random access request.

Furthermore, the third network node is configured to determine the first network node and the second network node as being neighbour nodes, and request the first network node and the second network node to establish a neighbour relation.

According to another aspect of embodiments herein, the object is achieved by a computer program, comprising instructions which, when executed on at least one processor, causes the at least one processor to carry out the method performed by the first network node.

According to another aspect of embodiments herein, the object is achieved by a computer program, comprising instructions which, when executed on at least one processor, causes the at least one processor to carry out the method performed by the second network node.

According to another aspect of embodiments herein, the object is achieved by a computer program, comprising instructions which, when executed on at least one processor, causes the at least one processor to carry out the method performed by the third network node.

According to another aspect of embodiments herein, the object is achieved by a carrier comprising the computer program, wherein the carrier is one of an electronic signal, an optical signal, a radio signal or a computer readable storage medium.

Since the first network node transmits the first information to the third network node, which first information relates to an identity of a preamble comprised in the received random access request and to a first reception time of the random access request, and since the first network node establishes a neighbour relation with the second network node based on a neighbour node determination performed by the third network node based on the first information, a simplified establishment of a neighbour node relation is provided. This results in an improved performance in the wireless communications network.

An advantage with embodiments herein is that the prior art always-on signalling is not needed for establishment of a neighbour relation.

Further, an advantage with embodiments herein is that the network nodes, e.g. the first and second network nodes, may establish inter-node relations as well as beam relations.

Furthermore, an advantage with embodiments herein is that the network nodes, e.g. the first and second network nodes, operating in the wireless communications network, e.g. a NX wireless communications network, may establish neighbour node relations without sacrificing the ultra-lean design principle, i.e., without needing to broadcast unique node identities.

Yet further, an advantage with embodiments herein is that the node relation establishment is transparent to the communications device. That is, the communications device will not be affected, in terms of e.g. quality of service, during the neighbour node relation establishment.

BRIEF DESCRIPTION OF DRAWINGS

Examples of embodiments herein are described in more detail with reference to attached drawings in which.

DETAILED DESCRIPTION

Figure 1:
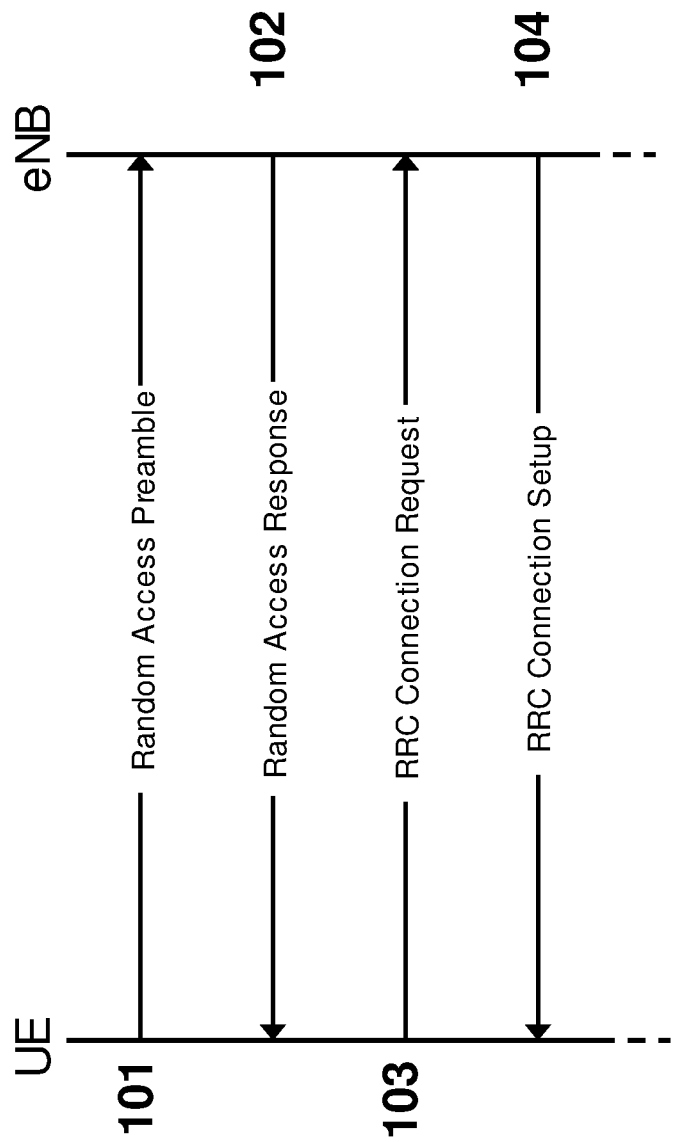
FIG. 1 is a schematic combined flowchart and signalling scheme illustrating the random access procedure according to the prior art.

In order to facilitate understanding of embodiments herein, some problems with the state of the art communications networks will first be identified and discussed.

As mentioned above, one drawback with prior art solutions for establishing neighbor node relations, e.g. neighbor base station relations, is that they are based on the transmission of always-on signals, e.g. always-on reference signals. But the always-on signaling is absent or almost absent in the NX communications networks by design and therefore a different approach is required as compared to the existing LTE solutions.

An object addressed by embodiments herein is therefore how to improve performance in a wireless communications network.

Therefore, as mentioned above, according to embodiments herein, a way of improving the performance in the wireless communications network is provided. Further, some embodiments disclosed herein relate to the establishment, e.g. the automatic establishment, of neighbour relations in the wireless communications network.

In order to overcome the above-mentioned drawback, embodiments herein provide a method to establish neighbour relations when a first network node, e.g. a new network node, such as a new NX network node, is installed in an existing wireless communications network, e.g. an existing NX communications network. However, it should be understood that the first network node may be an existing network node, e.g. a network node already exiting in the wireless communications network, and which network node needs to find new neighbour relations. This may for example be the case when the physical environment is changes in the vicinity of the node, for example when a new building is constructed or a new road is opened.

An idea used in the procedure is to use the slow start up of the first network node during which the first network node will listen to the random access requests from different communications devices, e.g. UEs, that it is able to hear. The first network node may report the random access requests it hears to a third network node to check which one or more second network nodes received the same random access preamble at the same point in time. Based on this information exchange the first network node may establish a neighbour relation with the one or more second network nodes. These one or more second network nodes is sometimes in this disclosure referred to as the first network node's neighbouring network nodes. Thus, the first network node may initially refrain from admitting the communications device in order to first identify any second network nodes, e.g. neighbouring network nodes, that may be able serve the communications device. After the determination of the neighbour node relations, the first network node may admit the communications device for communication. Thereby, the capacity of the wireless communications network is optimised while taking the energy consumption into consideration.

Embodiments disclosed herein relate to recent technology trends that are of particular interest in a 5G context. However embodiments disclosed herein are applicable also in further development of the existing mobile broadband systems such as WCDMA and LTE.

Note that although terminology from 3GPP LTE may be used in this disclosure to exemplify the embodiments herein, this should not be seen as limiting the scope of the embodiments herein to only the aforementioned system. Other wireless systems, including Wideband Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 2:
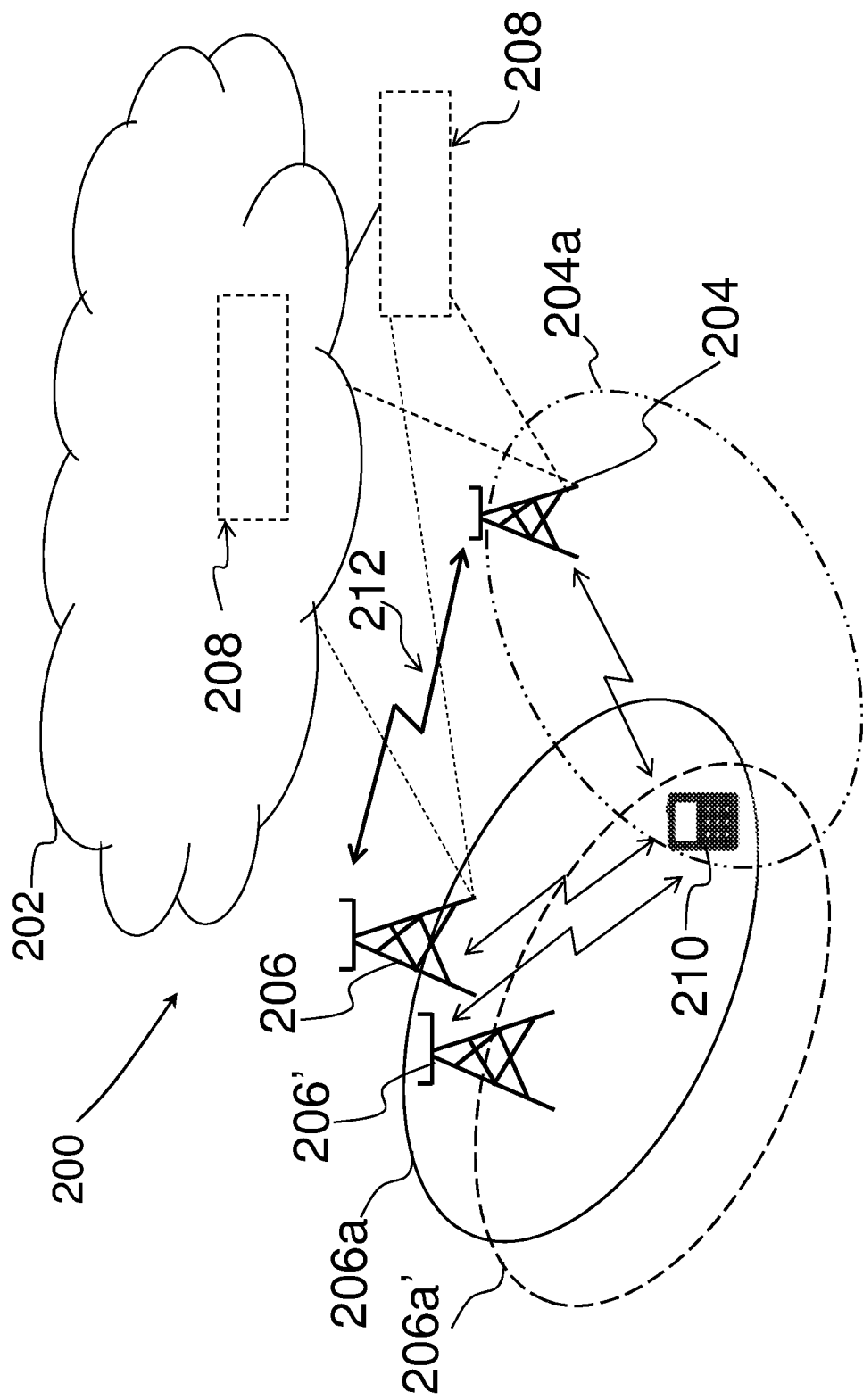
FIG. 2 is a schematic block diagram schematically illustrating embodiments of a wireless communications network.

Embodiments herein relate to a wireless communications network 200 as schematically illustrated in FIG. 2. For example, embodiments herein may be implemented in the wireless communications network 200. The wireless communications network 200 may be a cellular communications network, such as e.g. a 5G network, an LTE network, a WCDMA network, an GSM network, any 3GPP cellular network, a WiMAX network, or any other wireless communications network or system.

A core network 202 may be comprised in the wireless communications network 200. The core network 202 is configured to operate in the wireless communications network 200. The core network 202 may be a wireless core network such as a 5G core network, an LTE core network, e.g. an Evolved Packet Core (EPC) network; a WCDMA core network; a GSM core network; any 3GPP core network; WiMAX core network; or any cellular core network.

A first network node 204 operates in the wireless communications network 200. The first network node 204 is sometimes in this disclosure referred to as a newly deployed node, and is thus a node that is newly installed to operate in the communications network 200. However, as previously mentioned, it should be understood that the first network node 204 may be an existing network node, e.g. a network node already exiting in the wireless communications network 200, and which network node needs to find new neighbour relations.

The first network node 204 may be a radio access node such as a radio base station, for example an eNodeB, also denoted eNB, a Home eNodeB, or a NodeB or any other network node capable to serve a communications device 210 when located within a first area 204*a*, e.g. a first geographical area, in a communications network, such as the communications network 200. In this disclosure, the first area 204*a* is sometimes referred to as a first coverage area, a first cell or a first cluster wherein the first network node 204 provides radio coverage, i.e. radio transmissions from the first network node 204 may be received within the first area 204*a*. Herein, this is also specified as the first network node 204 manages or is configured to manage communication with the communications devices 210 in the first area 204*a*. Sometimes in this disclosure this is also referred to as the first network node 204 is associated with communications device 210 when it is located and/or operates within the first area 204*a*.

Thus, the terms first area 204*a*, first coverage area 204*a*, first cell 204*a* and first cluster 204*a* may be used interchangeably.

Other examples of the first network node 204 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

A second network node 206 operates in the wireless communications network 200. The second network node 206 is sometimes in this disclosure referred to as an existing node, and is thus a node operating in the communications network 200 before the introduction of the first network node 204 into the communications network 200.

The second network node 206 may be a radio access node such as a radio base station, for example an eNodeB, also denoted eNB, a Home eNodeB, or a NodeB or any other network node capable to serve a communications device 210 when located within a second area 206a, e.g. a second geographical area, in a communications network, such as the communications network 200. In this disclosure, the second area 206a is sometimes referred to as a second coverage area, a second cell or a second cluster wherein the second network node 206 provides radio coverage, i.e. radio transmissions from the second network node 206 may be received within the second area 206a. Herein, this is also specified as the second network node 206 manages or is configured to manage communication with the communications devices 210 in the second area 206a. Sometimes in this disclosure this is also referred to as the second network node 206 is associated with communications device 210 when it is located and/or operates within the second area 206a.

Thus, the terms second area 206a, second coverage area 206a, second cell 206a and second cluster 206a may be used interchangeably.

Other examples of the second network node 206 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

One or more further second network nodes 206' may operate in the wireless communications network 200. The one or more further second network nodes 206' are sometimes in this disclosure referred to as one or more further existing nodes, and are thus nodes operating in the communications network 200 before the introduction of the first network node 204 into the communications network 200, or when the first network node 204 is an existing network node needing to find new neighbour relations due to for example changes in the physical environment.

Each one of the one or more further second network nodes 206' may be a radio access node such as a radio base station, for example an eNodeB, also denoted eNB, a Home eNodeB, or a NodeB or any other network node capable to serve a communications device 210 when located within a respective further second area 206a', e.g. a further second geographical area, in a communications network, such as the communications network 200. In this disclosure, each one of the one or more further second area 206a' is sometimes referred to as a further second coverage area, a further second cell or a further second cluster wherein one of the one or more further second network node 206' provides radio coverage, i.e. radio transmissions from the one or more further second network node 206' may be received within the respective further second area 206a'. Herein, this is also specified as each one of the one or more further second network nodes 206' manages or is configured to manage communication with the communications devices 210 in the respective further second area 206a'. Sometimes in this disclosure this is also referred to as each one of the one or more of the further second network nodes 206' is associated with communications device 210 when it is located and/or operates within the respective further second area 206a'.

Thus, the terms further second area 206a', further second coverage area 206a', further second cell 206a and further second cluster 206a' may be used interchangeably.

Other examples of the one or more further second network node 206' are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

A third network node 208 operates in the wireless communications network 200.

In some embodiments, the third network node 208 is a central node that may operate in the core network 202, and then the third network node 208 may be a core network node or it may be comprised in the core network node. For example, the core network node may be an Evolved-Serving Mobile Location Centre (E-SMLC), a Mobile Switching Center (MSC), a Mobility Management Entity (MME), an Operation & Maintenance (O&M) node, a Serving GateWay (S-GW), a Serving General Packet Radio Service (GPRS) Node (SGSN), etc.

Alternatively, the third network node 208 may be arranged separately from and in communication with the core network 202.

In some embodiments, the third network node 208 corresponds to a node or is comprised in a node that operates in a so called computer cloud or computing cloud. The node operating in the cloud may be referred to as a cloud node, and thus the third network node 208 may correspond to the cloud node or the third network node 208 may be comprised in the cloud node. The computing cloud may also be referred to as a cloud system of servers or computers, or simply be named a cloud for providing certain service(s) to outside the cloud via a communication interface. The exact configuration of nodes etc. comprised in the cloud in order to provide said service(s) may not be known outside the cloud. The name "cloud" is often explained as a metaphor relating to that the actual device(s) or network element(s) providing the services are typically invisible for a user of the provided service(s), such as if obscured by a cloud.

A communications device 210 operates in the wireless communications network 200. In some embodiments disclosed herein, the non-limiting term User Equipment (UE) is used and it refers to any type of communications device communicating with a network node in a communications network. Examples of communications devices are wireless devices, target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles etc.

In this disclosure the terms communications device, wireless device and UE are used interchangeably. Further, it should be noted that the term UE used in this disclosure also covers other communications devices such as Machine Type of Communication (MTC) device, an Internet of Things (IoT) device, e.g. a Cellular IoT (CIoT) device. Please note the term user equipment used in this document also covers other wireless devices such as Machine to Machine (M2M) devices, even though they do not have any user.

An example of how the first network node 204, the second network node 206, the third network node 208 and the communications device 210 may operate for establishment of a neighbour relation, will now be described with reference to the combined flowchart and signalling scheme depicted in FIG. 3. As previously mentioned, the first, second and third network nodes 204, 206, 208 and the communications device 210 are operating in the wireless communications network 200.

The neighbour relation may be a node neighbour relation or a beam neighbour relation, wherein the node neighbour relation relates to a relation between neighbouring nodes and the beam neighbour relation relates to a relation between neighbouring beams. Thus, the neighbour relation may describe as a connection between two neighbouring nodes, e.g. between two neighbouring network nodes, or it may describe a connection between two beams. Further, two network nodes may be considered as being neighbouring nodes when they are located within a radio coverage of each other and/or within radio coverage of the communication device 210. Furthermore, two beams may be considered as being neighbouring beams when they are located within a radio coverage of each other and/or within radio coverage of the communication device 210.

Figure 3:
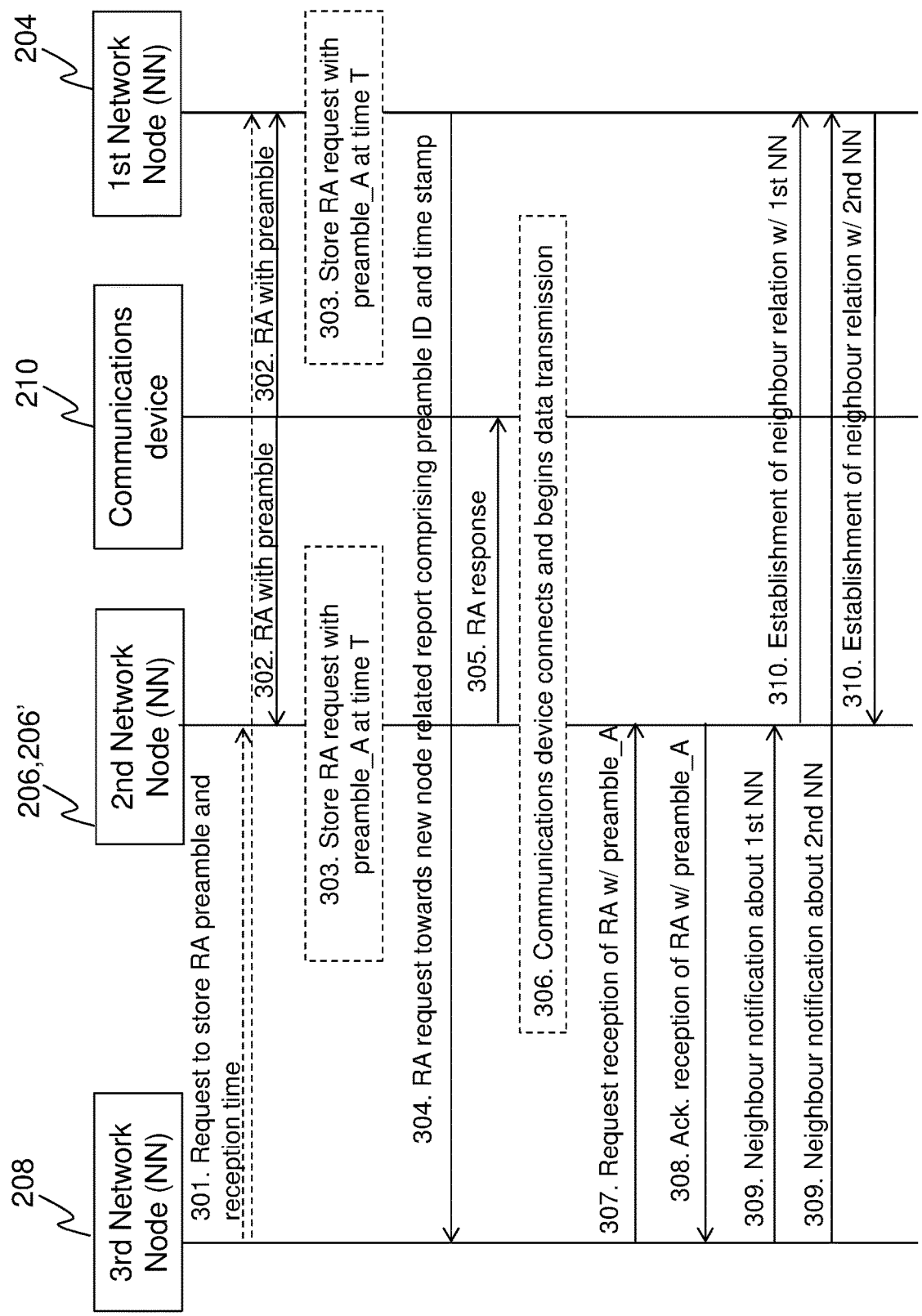
FIG. 3 is a schematic combined flowchart and signalling scheme of embodiments of a wireless communications network.

The procedure depicted in FIG. 3 comprises one or more of the following actions. It should be understood that these actions may be taken in any suitable order and that some actions may be combined.

Action 301

This action is optional. As illustrated in FIG. 3, the third network node 208 may transmit, to the second network node 206, a request to store one or more random access preambles received and to store the point of time for each preamble reception, e.g. store the reception time for each received random access preamble.

Further, additionally or alternatively, the third network node 208 may transmit to, the first network node 204, a request to store one or more random access preambles received and to store the point of time for each preamble reception, e.g. store the reception time for each received random access preamble.

Thus, the third network node 208 optionally configures a newly deployed node, e.g. the first network node 204, and/or a set of existing nodes, e.g. one or more of second nodes 206, 206', in the vicinity of the new node, to store the received random access preamble and the corresponding time stamp of receiving it.

This is done in order to instruct the first and/or second network nodes 204, 206 to collect information relating to received preambles. In other words, at least one of the first and second network nodes 204, 206 is instructed to collect information relating to received preambles. The third network node 208 may also instruct the first and/or second network nodes 204, 206 to transmit collected information to it. As will be described below, information relating to received preambles may be used by the third network node 208 to determine neighbour node relations, i.e. to determine if the first and second network nodes 204, 206 are neighbouring nodes.

Action 302

In order to initiate communication, e.g. a data transfer, with a network node, the communications device 210 transmits a Random Access (RA) with a random access preamble. Sometimes in this disclosure the random access preamble is referred to as a preamble_A. The transmitted random access preamble may be received by the first network node 204 and by the second network node 206. It should be understood that the point of time of the respective reception may be different.

The communications device 210 performs the random access in order to connect to the communications network 200. It is assumed that the communications device 210 is within the coverage area of the newly deployed node, e.g. within the first coverage area 204a of the first network node 204. Further, it is assumed that the random access from the communications device 210 is heard by the first network node 204 and also by one or more of the existing nodes, e.g. by one or more second network node 206, 206'. The communications device 210 picks a random access preamble preamble_A randomly amongst the whole set of preambles for the initial access.

Action 303

This action is optional. The first and second network nodes 204, 206, 206' may store the received random access request, the preamble preamble_A and the point of time T of their respective reception. As mentioned above, this may be done in order to be able to report this information to the third network node 208, either mandatory, optionally or upon request.

Further, the first network node 204 may generate a report based on the received information about the random access related content. For example, the report may comprise information about the preamble preamble_A such as the identity of the preamble, and information about the point of time T when the preamble was received by the first network node 204.

It should be understood that also the one or more second network nodes 206,206' may generate a report as described above.

Action 304

In order to inform the third network node 208 about received one or more random access preambles, the first network node 204 transmits the generated report to the third network node 208. The third network node 208 is capable of identifying the one or more second network nodes 206, 206' that was/were able to hear the random access with the mentioned preamble preamble_A at the same or similar point of time. By similar point of time is meant so close to each other that the difference in time corresponds to the different distances of the propagation paths from the communications device 210 and the first network node 204 and the one or more second network nodes 206, 206' respectively.

Action 305

In response to the received Random Access request, the one or more second network nodes 206, 206' transmit a Random Access Response (RAR) towards the communications device 210.

Even if not shown in FIG. 3, it should be understood that the first network node 204 may transmit a random access response towards the communications device 210. This may be perform alternatively or additionally to the random access response transmitted from the one or more second network nodes 206,206'.

The first and second network nodes 204, 206, 206' may transmit the random access response on a Downlink Shared Channel (DL-SCH). The random access response may address the communications device 210 with a Random Access Radio Network Temporary Identifier (RA-RNTI) but the random access response may also assign a Temporary Cell RNTI (C-RNTI). The random access response may also send a timing adjustment to correct the uplink timing from the communications device 210. Optionally, the random access response may assign resources to the communications device 210 terminal for uplink transmission.

Action 306

This action is optional. The second network node 206 may continue with the connection and data transmission with, e.g. towards, the communications device 210.

It should be understood that, even if not shown in FIG. 3, in some embodiments, wherein the first network node 204 has transmitted the random access response towards the communications device 210 as described in Action 305 above, the first network node 204 may continue with the connection and data transmission with, e.g. towards, the communications device 210.

Action 307

The third network node 208 requests one or more second network nodes 206,206' located in the vicinity of the first network node 204 to report any reception of RA with preamble_A in order to identify the random access reception with the preamble preamble_A at a point of time T. For example, the third network node 208 may request the second network node 206,206' to transmit an acknowledgement (ACK) if the second network node 206,206' has received the random access reception with the preamble preamble_A at a point of time T, and a negative acknowledgement (NACK) if the second network node 206,206' has not received the random access reception with the preamble preamble_A at a point of time T, respectively. It should be understood that in this disclosure the point of time T may be seen as a range of a time interval to narrow down the search for the random access comprising the specific preamble used by the communications device 210. For example, the point of time T may be seen as an interval comprising points of time so close to each other that the difference in time corresponds to the different distances of the propagation paths from the communications device 210 to the first network node 204 and to the one or more second network nodes 206, 206' respectively. It is worth noting that even though the same notation T for the reception time of the preamble is used for all the network nodes 204, 206, 206' involved, the reception time might not be exactly identical for the different network nodes 204, 206, 206' due to propagation properties. Thus, the point of time T should be seen as a rough reception time of the preamble_A that may vary slightly for different network nodes 204, 206, 206'. By the term "slightly" when used herein is meant that the time difference is at a magnitude corresponding to the difference in time of arrival of the signal from the communications device 210 to the first network node 204 and to the one or more second network nodes 206, 206' respectively.

Action 308

The one or more second network nodes 206,206' that received the preamble preamble_A at the point of time T transmits, to the third network node 208, an acknowledgement of the reception of the preamble at the point of time T. This is done in order to inform the third network node 208 about the received preamble. As will be described below, in for example Action 805, by means of information relating to received preambles the third network node 208 is able to determine neighbor node relations. However, if the preamble preamble_A was not received at the point of time T, the one or more second network nodes 206,206' may transmit a negative acknowledgement of receipt to the third network node.

Action 309

In order to inform the one or more second network nodes 206,206' about a neighboring network node, the third network node 208 informs the one or more second network nodes 206,206' about the presence of the first network node 204. Alternatively or additionally, in order to inform the first network node 204 about a neighboring network node, the third network node 208 informs the first network node 204 about the presence of the one or more second network nodes 206,206'.

Action 310

The one or more second network nodes 206,206' initiate establishment of a neighbor relation with the first network node 204. Alternatively or additionally, the first network node 204 initiates establishment of a neighbor relation with the one or more second network nodes 206,206'.

Figure 4:
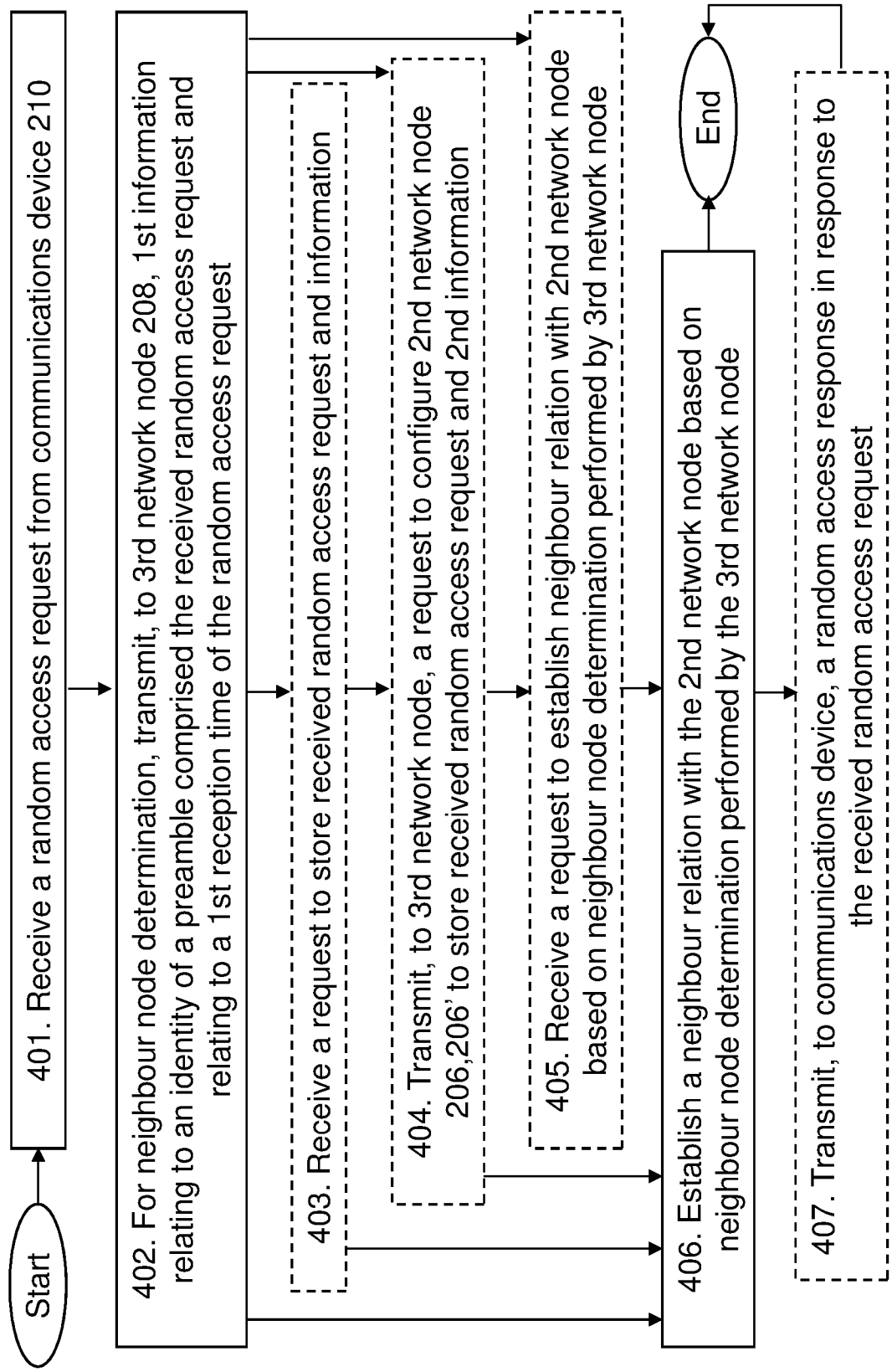
FIG. 4 is a flowchart schematically illustrating embodiments of a method performed by a first network node.

Examples of methods performed by the first network node 204 for establishing a neighbour relation with the second network node 206 will now be described with reference to the flowchart depicted in FIG. 4. As previously mentioned, the first network node 204 and the second network node 206 are operating in the wireless communications network 200. Further, as also previously mentioned, the neighbour relation may be a node neighbour relation or a beam neighbour relation, wherein the node neighbour relation relates to a relation between neighbouring nodes and the beam neighbour relation relates to a relation between neighbouring beams.

The methods comprise one or more of the following actions. It should be understood that the actions may be taken in any suitable order and that some actions may be combined. Actions that are optional are presented in dashed boxes in FIG. 4.

Action 401

The first network node 204 receives a random access request from a communications device 210 operating in the wireless communications network 200.

This Action relates to Action 302 previously described.

Action 402

For neighbour node determination, the first network node 204 transmits, to the third network node 208 operating in the wireless communications network 200, a first information, which first information relates to an identity of a preamble comprised in the received random access request and to a first reception time of the random access request.

In some embodiments, the first network node 204 transmits the first information to the third network node 208 when a signal strength of the received random access request is above a threshold value.

This Action relates to Action 304 previously described.

Action 403

In some embodiments, the first network node 204 receives, from the third network node 208, a request to store the received random access request and the first information.

This Action relates to Action 303 previously described.

Action 404

In some embodiments, the first network node 204 transmits, to the third network node 208, a request to configure the second network node 206 and/or one or more further second network nodes 206' to store the random access request when received by the second network node 206 or the one or more further second network nodes 206' and to store a second information, which second information relates to the identity of a preamble comprised in the received random access request and to a second reception time of the received random access request when received by the respective any one or more out of the second network node 206 and one or more further second network nodes 206'.

Action 405

In some embodiments, the first network node 204 receives, from the second network node 206 or the third network node 208, a request to establish the neighbour relation with the second network node 206 based on the neighbour node determination performed based on the first information by the third network node 208.

When the first network node 204 receives the request from the second network nodes 206, the second network node 206 may have received the request from the third network node 208.

However, it should be understood that in some embodiments, the first network node 204 receives a notification that a neighbouring node, e.g. the second network node 206, has been identified. In such embodiments, the first network node 204 may decide to establish a neighbour relation with the identified neighbouring node, e.g. the second network node 206. The notification may be received from the third network node 208. Thus, in some embodiments, the first network node 204 receives the notification from the second network node 206 or the third network node 208.

This relates to Action 309 previously described.

Action 406

The first network node 204 establishes a neighbour relation with the second network node 206 based on a neighbour node determination performed based on the first information by the third network node 208.

In some embodiments, by establishing a neighbour relation with the second network node 206 is meant that the first network node 204 possibly sets up a communications link 212 with the second network node 206 and updates neighbour information with information relating to the second network node 206. For example, a Neighbour Relation Table (NRT) may be updated with information relating to the second network node 206. Further, the first network node 204 may set up the communication link 212 if a communication link is not already set up with the second network node 206. This may for example be the case when a beam neighbour relation is set up. Thus, the communication link 212 may be set up at the same time as the beam relation. However, it should be understood that the communication link 212 may be set up before the setup of the beam relation. Thus, the communication link 212 may be set up at a first point in time preceding a second point in time for the set of the beam relation.

The first network node 204 may also establish beam relations with the neighbour node 206. In some embodiments, by establishing a beam relation is meant that the beam identifiers of the beams corresponding to the RA direction of the received preamble are exchanged and stored in a neighbour relation table. Thus, the first network node 204 may exchange and store one or more beam identifiers in a neighbour relation table. For beam relation establishment, the first network node 204 and the second node 206 may need to relate the neighbour relations to appropriate beams. For example, if the first network node 204 has N1 downlink beams and the second network node 206 has N2 downlink beams, then upon neighbour relation establishment, the nodes 204,206 may identify that a particular beam (say beam number B1) from the first network node 204 should establish beam relations with beam B2 of the second network node 206. In order to do so, the nodes 204,206 may translate the reception of the random access request in the uplink into an appropriate DL beam.

This Action relates to Action 310 previously described.

Action 407

The first network node 204 may transmit, to the communications device 210, a random access response in response to the received random access request.

The first network node 204 may transmit the random access response to the communications device 210 by transmitting the random access response when the signal strength of the received random access request is above a threshold value, by transmitting the random access response after reception of a plurality of random access request, and/or by transmitting the random access response at randomly determined point of time.

In some embodiments, Action 407 is performed before Actions 405 and 406.

Action 407 relates to Action 305 previously described.

Figure 5:
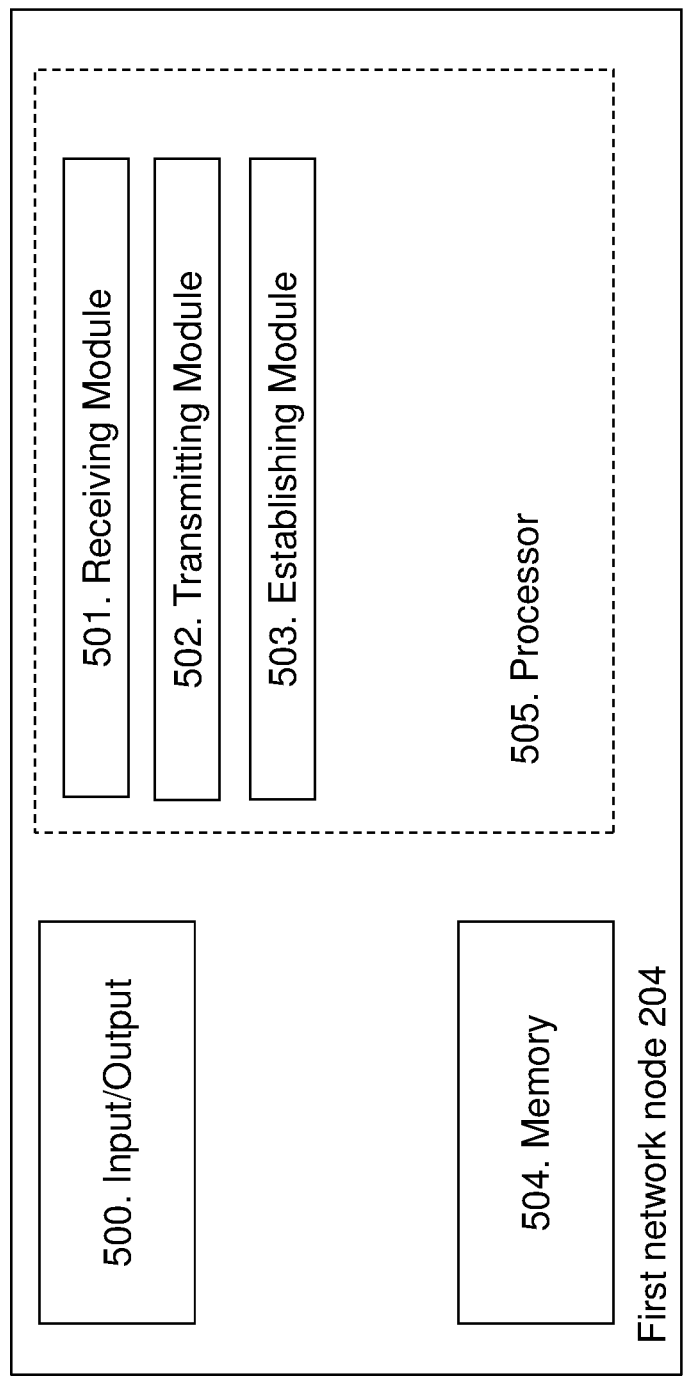
FIG. 5 is a schematic block diagram schematically illustrating embodiments of a first network node.

To perform the method for establishing a neighbour relation with the second network node 206, the first network node 204 may be configured according to an arrangement depicted in FIG. 5. As previously mentioned, the first network node 204 and the second network node 206 are operating in the wireless communications network 200.

The first network node 204 comprises an input and output interface 500 configured to communicate, with one or more network nodes, e.g. the second network node 206, the one or more further second network nodes 206', and/or the third network node 208, operating in the wireless communications network 100. The input and output interface 500 may comprise a wireless receiver (not shown) and a wireless transmitter (not shown).

The first network node 204 is configured to receive, e.g. by means of a receiving module 501 configured to receive, a transmission from the communications device 210 or from one or more network nodes, e.g. the second network node 206, the one or more further second network nodes 206', and/or the third network node 208, operating in the wireless communications network 200. The receiving module 501 may be implemented by or arranged in communication with a processor 505 of the first network node 204. The processor 505 will be described in more detail below.

The first network node 204 is configured to receive a random access request from the communications device 210 operating in the wireless communications network 200.

In some embodiment, the first network node 204 is configured to receive, from the third network node 208, a request to store the received random access request and the first information.

The first network node 204 may receive, from the second network node 206 or the third network node 208, a request to establish the neighbour relation with the second network node 206 based on the neighbour node determination performed based on the first information by the third network node 208.

The first network node 204 is configured to transmit, e.g. by means of a transmitting module 502 configured to transmit, a transmission to the communications device 210 or to one or more network nodes, e.g. the second network node 206, the one or more further second network nodes 206', and/or the third network node 208, operating in the wireless communications network 200. The transmitting module 402 may be implemented by or arranged in communication with the processor 505 of the first network node 204.

In order to obtain a neighbour node determination, the first network node 204 is configured to transmit, to the third network node 208 operating in the wireless communications network 200, a first information. The first information relates to an identity of a preamble comprised in the received random access request and to a first reception time of the random access request.

The first network node 204 may transmit the first information when a signal strength of the received random access request is above a threshold value.

In some embodiment, the first network node 204 is configured to transmit, to the third network node 208, a request to configure the second network node 206 and/or one or more further second network nodes 206' to store the random access request when received by the second network node 206 or by the one or more further second network nodes 206' and to store a second information. The second information may relate to the identity of a preamble comprised in the received random access request and to a second reception time of the received random access request when received by the respective any one or more out of the second network node 206 and one or more further second network nodes 206'.

The first network node 204 may be configured to transmit, to the communications device 210, a random access response in response to the received random access request. In such embodiments, the first network node 204 is configured to transmit the random access response to the communications device 210 by being configured to transmit the random access response when the signal strength of the received random access request is above a threshold value; to transmit the random access response after reception of a plurality of random access request, and/or to transmit the random access response at randomly determined point of time.

The first network node 204 is configured to establish, e.g. by means of an establishing module 503 configured to establish, a neighbour relation with the second network node 206 and possibly with one or more further second network nodes 206'. The establishing module 503 may be implemented by or arranged in communication with the processor 505 of the first network node 204.

The first network node 204 is configured to establish a neighbour relation with the second network node 206 based on a neighbour node determination performed based on the first information by the third network node 208.

In some embodiments, the first network node 204 is configured to establish the neighbour relation with the second network node 206 by being configured to set up a communications link 212 with the second network node; and to update neighbour information with information relating to the second network node 206.

Further, the first network node 204 may be configured to establish beam relations. Thus, the first network node 204 may be configured to exchange and store one or more beam identifiers in a neighbour relation table.

The first network node 204 may also comprise means for storing data. In some embodiments, the first network node 204 comprises a memory 504 configured to store the data. The data may be processed or non-processed data and/or information relating thereto. The memory 504 may comprise one or more memory units. Further, the memory 504 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the first network node 204.

Embodiments herein for establishing a neighbour relation with the second network node 206 may be implemented through one or more processors, such as the processor 505 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the first network node 204. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first network node 204.

Those skilled in the art will also appreciate that the input/output interface 500, the receiving module 501, the transmitting module 502, and the establishing module 503 above may refer to a combination of analog and digital circuits, and/or one or more processors configured with software and/or firmware, e.g. stored in the memory 504, that when executed by the one or more processors such as the processors in the first network node 204 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 6:
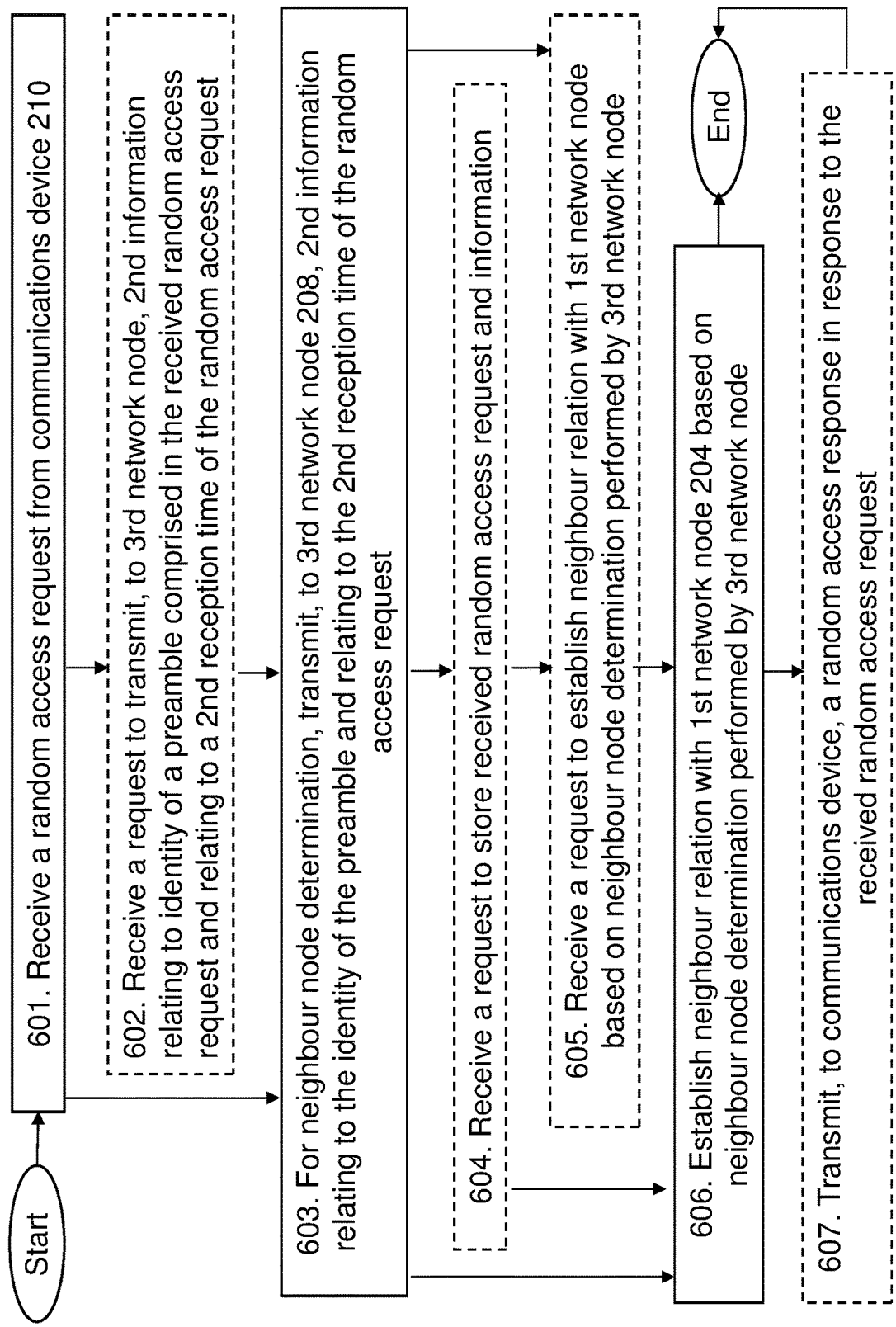
FIG. 6 is a flowchart schematically illustrating embodiments of a method performed by a second network node.

Examples of methods performed by the second network node 206 for establishing a neighbour relation with the first network node 204 will now be described with reference to the flowchart depicted in FIG. 6. As previously mentioned, the first network node 204 and the second network node 206 are operating in the wireless communications network 200. Further, as also previously mentioned, the neighbour relation may be a node neighbour relation or a beam neighbour relation, wherein the node neighbour relation relates to a relation between neighbouring nodes and the beam neighbour relation relates to a relation between neighbouring beams.

The methods comprise one or more of the following actions. It should be understood that the actions may be taken in any suitable order and that some actions may be combined. Actions that are optional are presented in dashed boxes in FIG. 6.

Action 601

The second network node 206 receives a random access request from the communications device 210 operating in the wireless communications network 200.

This Action relates to Action 302 previously described.

Action 602

The second network node 206 may receive, from the third network node 208, a request to transmit to the third network node 208 a second information. The second information may relate to an identity of a preamble comprised in the received random access request and to a second reception time of the random access request.

This Action relates to Action 307 previously described. As previously mentioned in Action 307, the third network node 208 may request the second network node 206 to transmit an acknowledgement (ACK) if the second network node 206 has received the random access reception with the preamble preamble_A at a point of time T, and a negative acknowledgement (NACK) if the second network node 206 has not received the random access reception with the preamble preamble_A at a point of time T, respectively. Thus, sometimes in this disclosures, the second information is an ACK or a NACK, or the second information comprises an ACK or a NACK. For example, the second information may comprise an acknowledgement (ACK) by means of which the second network node 206 acknowledges reception of the random access reception with the preamble preamble_A at the point of time T. Thus, the second information, e.g. the ACK, relates to the identity of the preamble preamble_A and to the second reception time, e.g. to the point of time T.

Action 603

For neighbour node determination, the second network node 206 transmits, to the third network node 208 operating in the wireless communications network 200, the second information. As mentioned above, the second information relates to an identity of a preamble comprised in the received random access request and to a second reception time of the random access request. Further, as also mentioned above, the second information may be an ACK or a NACK or it may comprise an ACK or a NACK.

In some embodiments, the second network node 206 transmits the second information to the third network node 208 when a signal strength of the received random access request is above a threshold value.

This Action relates to Action 308 previously described.

Action 604

In some embodiments, the second network node 206 receives, from the third network node 208, a request to store the received random access request and the second information.

Thus, the second network node 206 may store information relating to one or more received random access requests, one or more received preambles and/or one or more reception times.

This Action relates to Actions 301 and 303 previously described.

Action 605

In some embodiments, the second network node 206 receives, from the first network node 204 or the third network node 208, a request to establish the neighbour relation with the first network node 204 based on the neighbour node determination performed based on the second information by the third network node 208.

This Action relates to Action 309 previously described.

Action 606

The second network node 206 establishes a neighbour relation with the first network node 204 based on the neighbour node determination performed based on the second information by the third network node 208.

In some embodiments, the second network node 206 established the neighbour relation with the first network node 204 by possibly setting up a communications link 212 with the first network node 204 and updating neighbour information with information relating to the first network node 204. In other words, the second network node 206 may set up the communication link 212 if a communication link is not already set up with the first network node 204.

The second network node 206 may also establish beam neighbour relations. In some embodiments and as previously mentioned, by establishing a beam relation is meant that the beam identifiers of the beams corresponding to the RA direction of the received preamble are exchanged and stored in a neighbour relation table. Thus, the second network node 206 may exchange and store one or more beam identifiers in a neighbour relation table.

This Action relates to Action 310 previously described.

Action 607

The second network node 206 may transmit, to the communications device 210, a random access response in response to the received random access request.

The second network node 206 may transmit the random access response to the communications device 210 by transmitting the random access response when the signal strength of the received random access request is above a threshold value, by transmitting the random access response after reception of a plurality of random access requests, and/or by transmitting the random access response at a randomly determined point of time.

This Action relates to Action 305 previously described.

Figure 7:
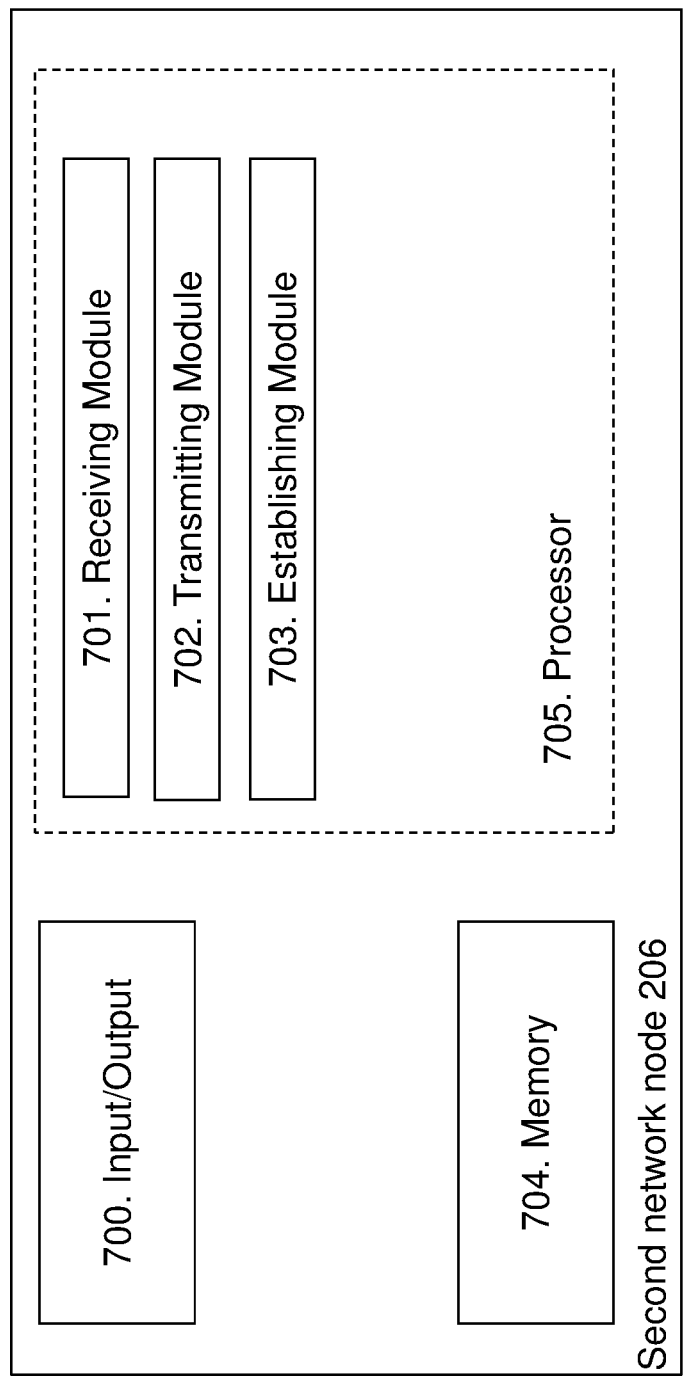
FIG. 7 is a schematic block diagram schematically illustrating embodiments of a second network node.

To perform the method for establishing a neighbour relation with the first network node 204, the second network node 206 may be configured according to an arrangement depicted in FIG. 7. As previously mentioned, the first network node 204 and the second network node 206 are operating in the wireless communications network 200.

The second network node 206 comprises an input and output interface 700 configured to communicate, with one or more network nodes, e.g. the first network node 204, the one or more further second network nodes 206', and/or the third network node 208, operating in the wireless communications network 100. The input and output interface 700 may comprise a wireless receiver (not shown) and a wireless transmitter (not shown).

The second network node 206 is configured to receive, e.g. by means of a receiving module 701 configured to receive, a transmission from the communications device 210 or from one or more network nodes, e.g. the first network node 204, the one or more further second network nodes 206', and/or the third network node 208, operating in the wireless communications network 200. The receiving module 701 may be implemented by or arranged in communication with a processor 705 of the second network node 206. The processor 705 will be described in more detail below.

The second network node 206 is configured to receive a random access request from the communications device 210 operating in the wireless communications network 200.

In some embodiment, the second network node 206 is configured to receive, from the third network node 208, a request to store the received random access request and the second information. Thus, the second network node 206 may be configured to store information relating to one or more received random access requests, one or more received preambles, and/or one or more reception times.

Further, the second network node 206 may receive, from the third network node 208, a request to transmit the second information to the third network node 208.

The second network node 206 may receive, from the first network node 204 or the third network node 208, a request to establish the neighbour relation with the first network node 204 based on the neighbour node determination performed by the third network node 208 based on the second information.

The second network node 206 is configured to transmit, e.g. by means of a transmitting module 702 configured to transmit, a transmission to the communications device 210 or to one or more network nodes, e.g. the first network node 204, the one or more further second network nodes 206', and/or the third network node 208, operating in the wireless communications network 200. The transmitting module 702 may be implemented by or arranged in communication with the processor 705 of the second network node 206.

In order to obtain a neighbour node determination, the second network node 206 is configured to transmit, to the third network node 208 operating in the wireless communications network 200, the second information. As previously mentioned, the second information relates to an identity of a preamble comprised in the received random access request and to a second reception time of the random access request. The second reception time is the point of time the second network node 206 received the preamble.

The second network node 206 may transmit the second information when a signal strength of the received random access request is above a threshold value.

The second network node 206 may be configured to transmit, to the communications device 210, a random access response in response to the received random access request. In such embodiments, the second network node 206 is configured to transmit the random access response to the communications device 210 by being configured to transmit the random access response when the signal strength of the received random access request is above a threshold value, to transmit the random access response after reception of a plurality of random access request, and/or to transmit the random access response at randomly determined point of time.

The second network node 206 is configured to establish, e.g. by means of an establishing module 703 configured to establish, a neighbour relation with the first network node 204 and possibly with one or more further second network nodes 206'. The establishing module 703 may be implemented by or arranged in communication with the processor 705 of the second network node 206.

The second network node 206 is configured to establish a neighbour relation with the first network node 204 based on a neighbour node determination performed by the third network node 208 based on the second information.

In some embodiments, the second network node 206 is configured to establish the neighbour relation with the first network node 204 by being configured to set up a communications link 212 with the first network node 204 and to update neighbour information with information relating to the first network node 204.

Further, the second network node 206 may be configured to establish beam relations. Thus, the second network node 206 may be configured to exchange and store one or more beam identifiers in a neighbour relation table.

The second network node 206 may also comprise means for storing data. In some embodiments, the second network node 206 comprises a memory 704 configured to store the data. The data may be processed or non-processed data and/or information relating thereto. The memory 704 may comprise one or more memory units. Further, the memory 704 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the second network node 206.

Embodiments herein for establishing a neighbour relation with the first network node 204 may be implemented through one or more processors, such as the processor 705 in the arrangement depicted in FIG. 7, together with computer program code for performing the functions and/or method actions of embodiments herein. The program code mentioned above may also be provided as a computer program product, for instance in the form of a data carrier carrying computer program code for performing the embodiments herein when being loaded into the second network node 206. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the second network node 206.

Those skilled in the art will also appreciate that the input/output interface 700, the receiving module 701, the transmitting module 702, and the establishing module 703 above may refer to a combination of analog and digital circuits, and/or one or more processors configured with software and/or firmware, e.g. stored in the memory 704, that when executed by the one or more processors such as the processors in the second network node 206 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Examples of methods performed by the third network node 208 for requesting establishment of a neighbour relation between the first network node 204 and the second network node 206 will now be described with reference to the flowchart depicted in FIG. 8. As previously mentioned, the first network node 204, the second network node 206 and the third network node 208 are operating in the wireless communications network 200. Further, as also previously mentioned, the neighbour relation may be a node neighbour relation or a beam neighbour relation, wherein the node neighbour relation relates to a relation between neighbouring nodes and the beam neighbour relation relates to a relation between neighbouring beams.

The methods comprise one or more of the following actions. It should be understood that the actions may be taken in any suitable order and that some actions may be combined. Actions that are optional are presented in dashed boxes in FIG. 8.

Action 801

In some embodiments, the third network node 208 transmits, to the second network node 206, a request to transmit to the third network node 208 the second information.

The third network node 208 may be triggered by the first network node 204 to transmit the request to the second network node 206.

This Action relates to Actions 307 and 602 previously described. As previously mentioned in Action 307, the third network node 208 may request the second network node 206 to transmit an ACK if the second network node 206 has received the random access reception with the preamble preamble_A at a point of time T, and a NACK if the second network node 206 has not received the random access reception with the preamble preamble_A at a point of time T, respectively.

Action 802

The third network node 208 receives, from the first network node 204, a first information, which first information relates to an identity of a preamble comprised in a random access request received by the first network node 204 and to a first reception time of the received random access request.

This Action relates to Actions 304, 404 previously described.

Action 803

The third network node 208 receives, from the second network node 206, a second information, which second information relates to the identity of the preamble comprised in a random access request a random access request received by the second network node 206 and to a second reception time of the received random access request.

This Action relates to Actions 308 and 603 previously described. Further, as mentioned above, the second information may be an ACK or a NACK or it may comprise an ACK or a NACK. Thus, sometimes in this disclosures, the second information is an ACK or a NACK, or the second information comprises an ACK or a NACK. For example, the second information may comprise an ACK by means of which the second network node 206 acknowledges reception of the random access reception with the preamble preamble_A at the point of time T. Thus, the second information, e.g. the ACK, relates to the identity of the preamble preamble_A and to the second reception time, e.g. to the point of time T.

Action 804

In some embodiments, the third network node 208 transmits, to the first network node 204 and/or the second network node 206, a request to store the received random access request and information relating to the identity of the preamble comprised in the received random access request and relating to the reception time of the random access request.

The third network node 208 may transmit the request to store the received random access request and information in response to an indication received from a network node, e.g. the first network node 204 and/or the second network node 206, that the network node needs other network nodes, for example network nodes geographically close, to store the received random access request and information, e.g. the preamble and time information. For example, the third network node 208 may transmit the request to store the received random access request and information to the first network node 204 in response to an indication received from the second network node 206, which indication indicates that the second network node 206 needs one or more other network nodes, e.g. the first network node 204, to store the received random access request and information, and vice versa.

This Action relates to Actions 301, 403 and 602 previously described.

Action 805

The third network node 208 determines the first network node 204 and the second network node 206 as being neighbour nodes.

In some embodiments, the third network node 208 determines the first network node 204 and the second network node 206 as being neighbour nodes by determining that the first and second information relate to the same identity of the preamble, and by determining that the first and second reception times are equal or almost equal. By the expression "almost equal reception times" is meant that the difference between the first and second reception times is within a desired threshold value. For example, the first and second reception times should be so close to each other that the difference in time corresponds to the different distances of the propagation paths from the communications device 210 to the first network node 204 and to the one or more second network nodes 206, 206' respectively. This Action relates to Action 309 previously described.

Action 806

The third network node 208 requests the first network node 204 and/or the second network node 206 to establish a neighbour relation.

This Action relates to Action 309 previously described.

Figure 8:
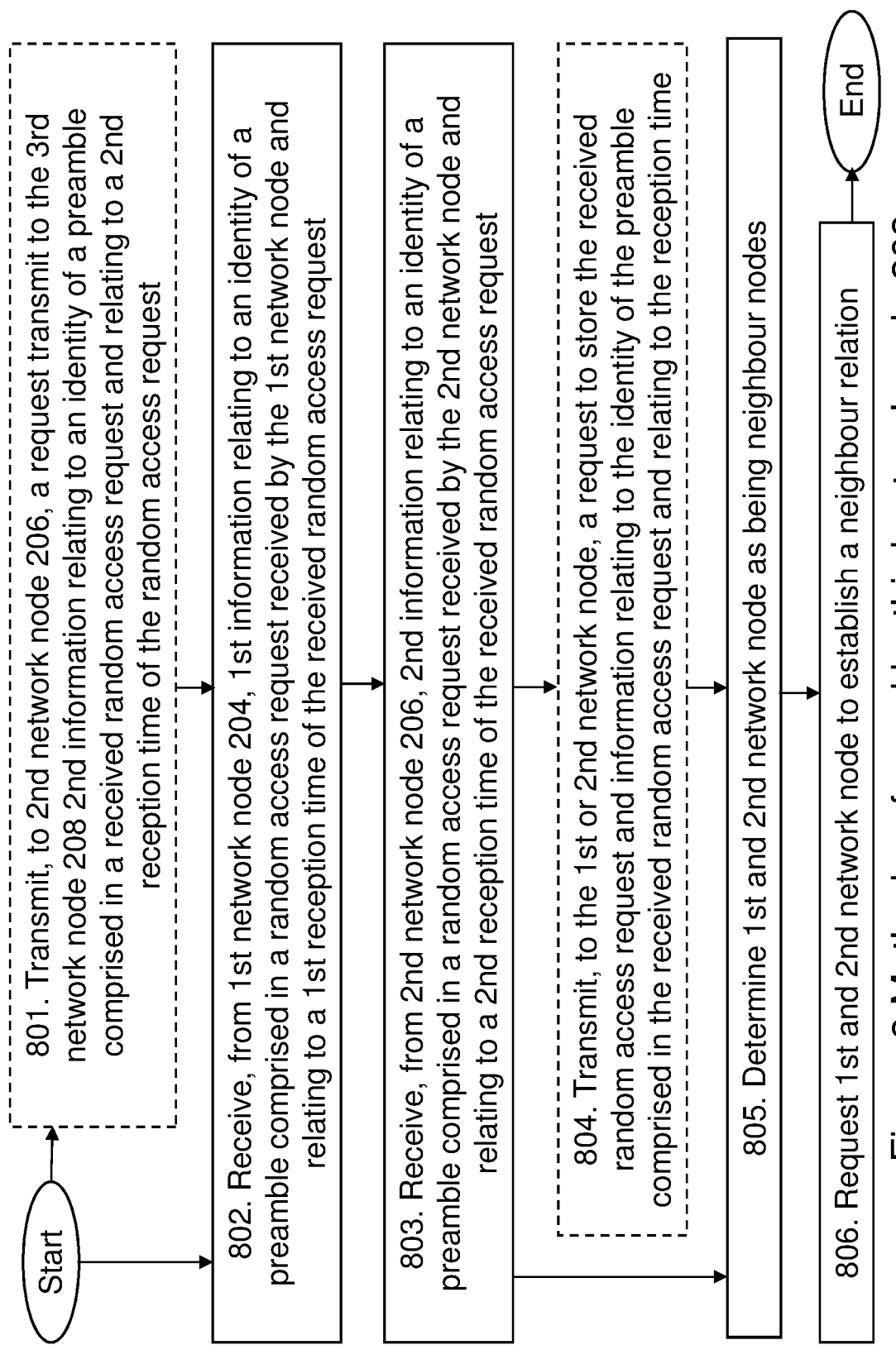
FIG. 8 is a flowchart schematically illustrating embodiments of a method performed by a third network node.

To perform the method for requesting establishment of a neighbour relation between the first network node 204 and the second network node 206, the third network node 208 may be configured according to an arrangement depicted in FIG. 8. As previously mentioned, the first network node 204, the second network node 206 and the third network node 208 are operating in the wireless communications network 200.

The third network node 208 comprises an input and output interface 900 configured to communicate, with one or more network nodes, e.g. the first network node 204, the second network node 206, the one or more further second network nodes 206', and/or with the communications device 210, operating in the wireless communications network 100. The input and output interface 900 may comprise a wireless receiver (not shown) and a wireless transmitter (not shown).

The third network node 208 is configured to receive, e.g. by means of a receiving module 901 configured to receive, a transmission from the communications device 210 or from one or more network nodes, e.g. the first network node 204, the second network node 206 and/or the one or more further second network nodes 206' operating in the wireless communications network 200. The receiving module 901 may be implemented by or arranged in communication with a processor 906 of the third network node 208. The processor 906 will be described in more detail below.

The third network node 208 is configured to receive, from the first network node 204, a first information. The first information relates to an identity of a preamble comprised in a random access request received by the first network node 204 and to a first reception time of the received random access request.

Further, the third network node 208 is configured to receive, from the second network node 206, a second information. The second information relates to the identity of the preamble comprised in a random access request received by the second network node 206 and to a second reception time of the received random access request.

The third network node 208 is configured to transmit, e.g. by means of a transmitting module 902 configured to transmit, a transmission to the communications device 210 or to one or more network nodes, e.g. the first network node 204, the second network node 206 and/or the one or more further second network nodes 206' operating in the wireless communications network 200. The transmitting module 902 may be implemented by or arranged in communication with the processor 906 of the third network node 208.

In some embodiments, the third network node 208 is configured to transmit, to the first network node 204 and/or the second network node 206, a request to store the received random access request and information relating to the identity of the preamble comprised in the received random access request and relating to the reception time of the random access request.

The third network node 208 may be configured to transmit, to the second network node 206, a request to transmit to the third network node 208 the second information.

The third network node 208 is configured to determine, e.g. by means of a determining module 903 configured to determine, two or more network nodes, e.g. two or more of the first network node 204, the second network node 206 and/or the one or more further second network nodes 206', as being neighbour nodes. The determining module 903 may be implemented by or arranged in communication with the processor 906 of the third network node 208.

The third network node 208 is configured to determine the first network node 204 and the second network node 206 as being neighbour nodes.

In some embodiments, the third network node 208 is configured to determine the first network node 204 and the second network node 206 as being neighbour nodes by being configured to determine that the first and second information relate to the same identity of the preamble; and determine that the first and second reception times are equal or almost equal.

The third network node 208 is configured to request, e.g. by means of a requesting module 904 configured to request, establishment of a neighbour relation. The requesting module 904 may be implemented by or arranged in communication with the processor 906 of the third network node 208.

The third network node 208 is configured to request the first network node 204 and/or the second network node 206 to establish a neighbour relation.

The third network node 208 may also comprise means for storing data. In some embodiments, the third network node 208 comprises a memory 905 configured to store the data. The data may be processed or non-processed data and/or information relating thereto. The memory 905 may comprise one or more memory units. Further, the memory 905 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the third network node 208.

Figure 9:
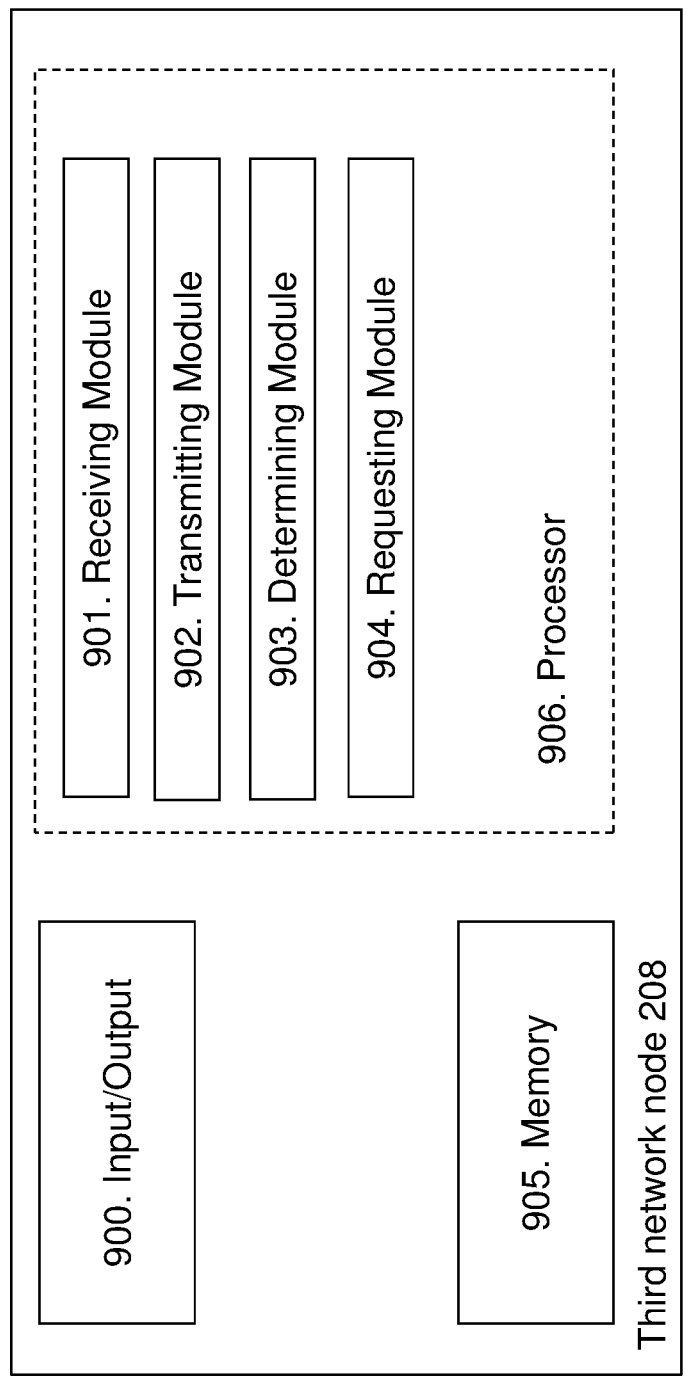
FIG. 9 is a schematic block diagram schematically illustrating embodiments of a third network node.

Embodiments herein for establishing a neighbour relation between the first network node 204 and the second network node 206 may be implemented through one or more processors, such as the processor 906 in the arrangement depicted in FIG. 9, together with computer program code for performing the functions and/or method actions of embodiments herein. The program code mentioned above may also be provided as a computer program product, for instance in the form of a data carrier carrying computer program code for performing the embodiments herein when being loaded into the third network node 208. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the third network node 208.

Those skilled in the art will also appreciate that the input/output interface 900, the receiving module 901, the transmitting module 902, the determining module 904 and the requesting module 904 above may refer to a combination of analog and digital circuits, and/or one or more processors configured with software and/or firmware, e.g. stored in the memory 905, that when executed by the one or more processors such as the processors in the third network node 208 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Examples

In some exemplifying embodiments, other network nodes that heard the RA request but communicated with the second network node 206 to send the single RAR message will also respond to the random access audibility request from the third network node 208, cf. Actions 307 and 801. Such embodiments will allow the establishment of neighbor relation dynamically with more than one neighbor network node.

In some exemplifying embodiments, the first network node 204 refrains from the transmission of the random access response only when the received quality on the Random Access Channel (RACH) is below certain threshold. Such embodiments come handy when the first network node 204 is covering a previously existing coverage hole.

In some exemplifying embodiments, the first network node 204 will wait for at least multiple RACH attempts before sending the RAR message in order to make sure that there is no other network node, e.g. the second network node 206, that could transmit the RAR to the communications device, e.g. to the communications device 210.

In some other exemplifying embodiments, the first network node 204 follows the mentioned procedure only probabilistically. This will enable the procedure to be used in the green-field scenario wherein the first network node 204 randomly, with a certain probability distribution according to the received quality of the RA request from the communications device 210, sends the RAR.

In some exemplifying embodiments, the third network node 208 pre-configures all the network nodes, e.g. the second and one or more further second network nodes 206, 206', to always store and report the RA preamble used by the communications device 210 to access the wireless communications network 200. In such embodiments, Actions 307 and 308 may be unnecessary as the third network node 208 already may know the network nodes hearing the corresponding RA attempt using a certain preamble.

In some other exemplifying embodiments, the process is initiated by the first network node 204 sending a request to the third network node 208 to request from other nodes, e.g. from the second or one or more further second network nodes 206, 206', to store the received random access preambles and corresponding time stamps of reception.

Abbreviations

AAS Active Antenna Systems
AN Access Node
ANR Automatic Neighbour Relation
BS Base Station
LTE Long Term Evolution
MIMO Multi Input Multi Output
MRS Mobility Reference Signal
RA Random Access
RACH Random Access Channel
RAR Random Access Response
RAT Radio Access Technology
UE User Equipment
WCDMA Wideband Code Division Multiple Access When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a radio network node operating in a wireless communications network, wherein the method comprises:

transmitting information to a further network node identifying a random access preamble received at the radio network node and indicating a first reception time; and establishing a neighbor relation with another radio network node in the wireless communications network, responsive to receiving an indication that the other radio network node neighbors the radio network node, the indication based on the further network node determining that the other radio network node received the same random access preamble at a second reception time, wherein a difference between the first reception time and the second reception time is within a desired threshold value and the difference corresponds to different distances of propagation paths from a communication device to the radio network node and to the other network node.

2. The method of claim 1, further comprising collecting the information sent to the further network node responsive to receiving a preceding request from the further network node.

3. The method of claim 1, further comprising transmitting a request to the further network node, requesting that the further network node configure one or more other radio network nodes to collect information identifying random access preambles received at the one or more other radio network nodes, along with corresponding reception times, for use by the further network node in identifying neighboring radio network nodes.

4. The method of claim 1, wherein transmitting the information to the further network node comprises transmitting the information responsive to the random access preamble being received at a signal strength above a defined threshold.

5. The method of claim 1, further comprising conditionally transmitting a response to the random access preamble based on at least one of the following conditions being met:
   a received signal strength of the random access preamble exceeding a defined threshold;
   reception of the random access preamble exceeding a defined number of random access requests; and
   reaching a randomly determined point of time.

6. The method of claim 1, wherein establishing the neighbor relation with the other radio network node comprises:
   setting up a communications link with the other radio network node; and
   updating neighbor information with information relating to the other radio network node.

7. The method of claim 1, wherein transmitting the information to the further network node comprises transmitting the information responsive to receiving a request from the further network node for the information.

8. The method of claim 1, wherein the indication is received from the further network node or the other radio network node, and wherein the indication comprises a request for the radio network node to establish the neighbor relation with the other radio network node.

9. A radio network node configured for operation in a wireless communications network, wherein the radio network node comprises:
   communication circuitry; and
   processing circuitry operatively associated with the communication circuitry and configured to:
      transmit information to a further network node identifying a random access preamble received at the radio network node and indicating a first reception time; and
      establish a neighbor relation with another radio network node in the wireless communications network, responsive to receiving an indication that the other radio network node neighbors the radio network node, the indication based on the further network node determining that the other radio network node received the same random access preamble at a second reception time, wherein a difference between the first reception time and the second reception time is within a desired threshold value and the difference corresponds to different distances of propagation paths from a communication device to the radio network node and to the other network node.

10. The radio network node of claim 9, wherein the processing circuitry is configured to collect the information sent to the further network node responsive to receiving a preceding request from the further network node.

11. The radio network node of claim 9, wherein the processing circuitry is configured to transmit a request to the further network node, requesting that the further network node configure one or more other radio network nodes to collect information identifying random access preambles received at the one or more other radio network nodes, along with corresponding reception times, for use by the further network node in identifying neighboring radio network nodes.

12. The radio network node of claim 9, wherein the processing circuitry is configured to transmit the information to the further network node responsive to the random access preamble being received at a signal strength above a defined threshold.

13. The radio network node of claim 9, wherein the processing circuitry is configured to conditionally transmit a random access response to the random access preamble, based on at least one of the following conditions being met:
   a received signal strength of the random access preamble exceeding a defined threshold;
   reception of the random access preamble exceeding a defined number of random access requests; and
   reaching a randomly determined point of time.

14. The radio network node of claim 9, wherein the processing circuitry is configured to establish the neighbor relation with the other radio network node by:
   setting up a communications link with the other radio network node; and
   updating neighbor information with information relating to the other radio network node.

15. The radio network node of claim 9, wherein the processing circuitry is configured to transmit the information to the further network node responsive to receiving a request from the further network node for the information.

16. The radio network node of claim 9, wherein the indication is received from the further network node or the other radio network node, and wherein the indication comprises a request for the radio network node to establish the neighbor relation with the other radio network node.

17. A method performed by a network node operating in a wireless communications network, the method comprising:
   receiving information from each of two or more radio network nodes, the information from each radio network node indicating identities and reception times for one or more random access preambles received at the radio network node; and
   identifying the two or more radio network nodes as neighboring radio network nodes based on determining from the received information that the two or more radio network nodes received the same random access preamble or preambles at a first reception time and a second reception time, wherein a difference between the first reception time and the second reception time is within a desired threshold value and the difference corresponds to different distances of propagation paths from a communication device to the radio network node and to the other network node; and sending an indication of the neighbor relationship to at least one of the two or more radio network nodes.

18. The method of claim 17, further comprising, in advance of receiving the information, sending requests to the two or more radio network nodes, requesting the collection of the information.

19. The method of claim 17, further comprising sending requests for the information to the two or more radio network nodes for the information and receiving the information responsive to the requests for the information.

20. A network node configured for operation in a wireless communications network, wherein the radio network node comprises:

communication circuitry; and processing circuitry operatively associated with the communication circuitry and configured to:

receive information from each of two or more radio network nodes, the information from each radio network node indicating identities and reception times for one or more random access preambles received at the radio network node; and identify the two or more radio network nodes as neighboring radio network nodes based on determining from the received information that the two or more radio network nodes received the same random access preamble or preambles at a first reception time and a second reception time, wherein a difference between the first reception time and the second reception time is within a desired threshold value and the difference corresponds to different distances of propagation paths from a communication device to the radio network node and to the other network node; and send an indication of the neighbor relationship to at least one of the two or more radio network nodes.

21. The network node of claim 20, wherein the processing circuitry is configured to, in advance of receiving the information, send requests to the two or more radio network nodes, requesting the collection of the information.

22. The network node of claim 20, wherein the processing circuitry is configured to send requests for the information to the two or more radio network nodes for the information and receive the information responsive to the requests for the information.

23. A non-transitory computer readable medium storing a computer program comprising instructions that, when executed on at least one processor of a radio network node configured for operation in a wireless communications network, cause the radio network node to:

transmit information to a further network node identifying a random access preamble received at the radio network node and indicating a first reception time; and establish a neighbor relation with another radio network node in the wireless communications network, responsive to receiving an indication that the other radio network node neighbors the radio network node, the indication based on the further network node determining that the other radio network node received the same random access preamble at a second reception time, wherein a difference between the first reception time and the second reception time is within a desired threshold value and the difference corresponds to different distances of propagation paths from a communication device to the radio network node and to the other network node.

24. A non-transitory computer readable medium storing a computer program comprising instructions that, when executed on at least one processor of a radio network node configured for operation in a wireless communications network, cause the radio network node to:

receive information from each of two or more radio network nodes, the information from each radio network node indicating identities and reception times for one or more random access preambles received at the radio network node; and identify the two or more radio network nodes as neighboring radio network nodes based on determining from the received information that the two or more radio network nodes received the same random access preamble or preambles at a first reception time and a second reception time, wherein a difference between the first reception time and the second reception time is within a desired threshold value and the difference corresponds to different distances of propagation paths from a communication device to the radio network node and to the other network node; and send an indication of the neighbor relationship to at least one of the two or more radio network nodes.

* * * * *